United States Patent

[11] 3,563,363

[72] Inventors Grover S. Harben
Gainesville;
Ernest E. Lewis, Flowery Branch, Ga.
[21] Appl. No. 695,449
[22] Filed Jan. 3, 1968
[45] Patented Feb. 16, 1971
[73] Assignee Gainesville Machine Company, Inc.
Gainesville, Ga.
a corporation of Georgia

[54] CONVEYOR SYSTEM
1 Claim, 4 Drawing Figs.

[52] U.S. Cl. ................................................. 198/177
[51] Int. Cl. .......................................... B65g 17/20
[50] Field of Search .......................................... 198/177;
24/125, 81 (CC); 17/44.1

[56] References Cited
UNITED STATES PATENTS

| | | | |
|---|---|---|---|
| 125,789 | 4/1872 | Clark............................ | 24/125 |
| 693,206 | 2/1902 | Wyckoff....................... | 24/125 |
| 1,460,534 | 7/1923 | Cornwall...................... | 198/177 |
| 2,976,983 | 3/1961 | Zebarth........................ | 198/177 |
| 3,380,113 | 4/1968 | Zebarth........................ | 198/177 |

*Primary Examiner*—Richard E. Aegerter
*Attorney*—Newton, Hopkins, Jones & Ormsby ABSTRACT: A conveyor system of the type utilized in a poultry-processing plant, including an elevated conveyor track, a chain movable along the conveyor track, a series of spaced rollers movable with the chain along the conveyor track, a plurality of shackles suspended below the conveyor track and connected to the rollers, and a connecting member fastened between adjacent ones of the shackles at a point spaced below the conveyor track for maintaining the adjacent ones of the shackles in spaced relationship.

Patented Feb. 16, 1971
3,563,363
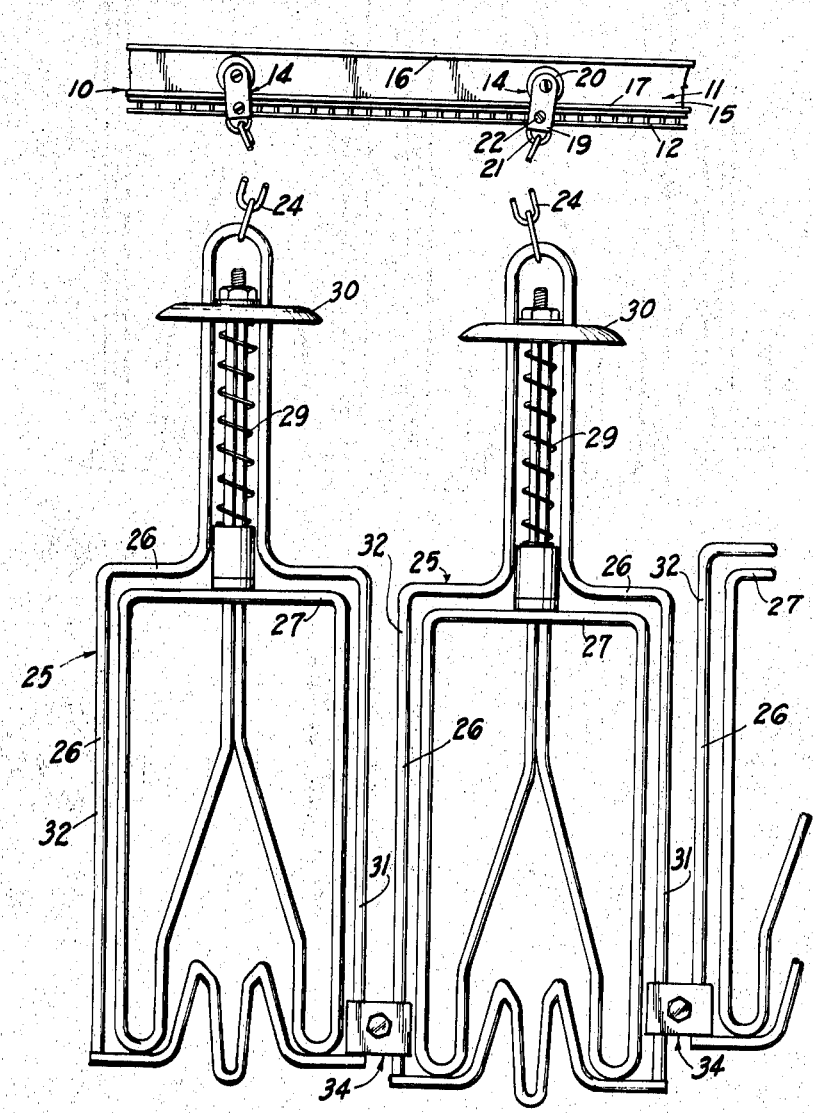
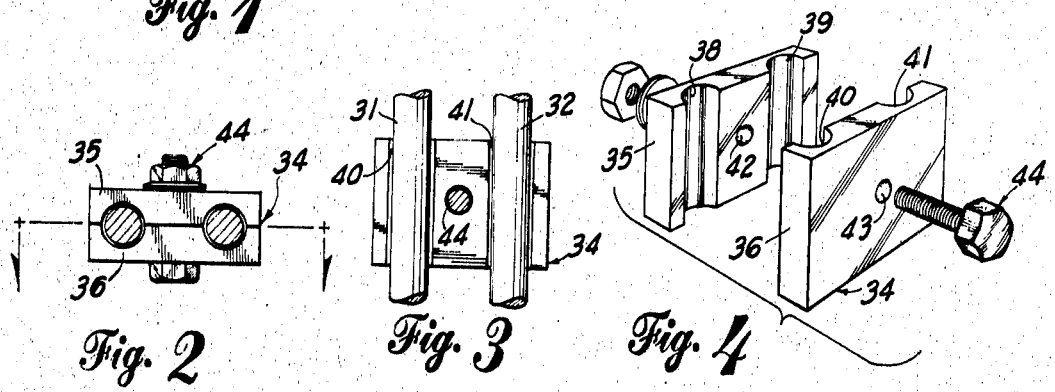
Fig. 1
Fig. 2
Fig. 3
Fig. 4
INVENTORS
GROVER S. HARBEN, JR.
ERNEST E. LEWIS
BY Newton, Hopkins,
Jones & Ormsby
ATTORNEYS

CONVEYOR SYSTEM

BACKGROUND OF THE INVENTION

In a poultry-processing plant where chickens or other poultry are processed through various stages of preparation, the chickens are usually conveyed between the processing stations by means of an elevated conveyor. The conveyor is usually of the type which includes a track and an endless chain movable along the length of the track which pulls trolleys or rollers. Shackles or fastening means are suspended from the trolleys, and the chickens are suspended from the shackles. Some shackles are arranged to suspend the chicken by its feet in a head-down attitude, while other shackles suspend the chicken from its neck in a feet-down attitude.

As the chickens pass through the processing plant, it is desirable to maintain the chickens oriented with respect to one another, and with respect to the direction of movement of the line of chickens, so that the various machines and workers can receive the individual chickens in a predetermined attitude, which assists the machine or workmen in performing its or his function. For instance, as the chicken is moved toward and processed through an automatic defeathering machine, it is desirable to maintain the carcass of the chicken in a head-down attitude with one leg following the other leg along the path of movement through the machine. As each individual chicken is processed through the machine, it is also desirable that each chicken maintain this attitude, and that a minimum of lateral movement and twisting take place, in spite of the continuous contact of the feather picking fingers with the carcass. In the past, it was necessary to space the chickens widely apart along the conveyor line as the chickens were processed through the feather picking machines since the contact of the picking fingers caused the chickens to twist, swing and bounce about within the machine, which caused the picking action of the fingers to be less effective, and required a relatively slow movement of the chickens through the picking machine.

SUMMARY OF THE INVENTION

This invention comprises a conveyor system for a poultry-processing plant, and includes an elevated conveyor track, a plurality of conveyor trolleys positioned at spaced intervals along the conveyor track and movable along the conveyor track under the influence of a continuous chain, a shackle connected to each conveyor trolley and suspended beneath the conveyor track, and a connecting clip fastened between adjacent ones of the shackles below the conveyor track for maintaining the shackles in spaced, aligned relationship. The clips function to stabilize each shackle with respect to the next adjacent shackles, so that a minimum of twisting and swinging of the chicken takes place beneath the conveyor track.

Thus, it is an object of this invention to provide a conveyor system for a poultry-processing plant which conveys the poultry in closely spaced relationship with a minimum of swinging and twisting of the poultry from the conveyor.

Another object of this invention is to provide a conveyor system for a poultry-processing plant which moves the poultry through the various stages of the processing plant in a predetermined attitude, and with a minimum of relative movement between adjacent carcasses.

Another object of this invention is to provide a conveyor system for a poultry processing plant which continuously maintains the poultry in an attitude suitable for optimum processing.

Other objects, features and advantages of the present invention will become apparent upon reading the following specification, when taken in conjunction with the accompanying drawing.

BRIEF DESCRIPTION OF THE DRAWING

FIG. 1 is a partial view of a poultry-processing plant conveyor line, showing the manner in which the shackles are suspended from the conveyor line.

FIG. 2 is a top view of a shackle clip.

FIG. 3 is a side view of the face of one-half of a shackle clip, taken along lines 3—3 of FIG. 2.

FIG. 4 is an exploded perspective view of a shackle clip.

DESCRIPTION OF THE PREFERRED EMBODIMENT

Referring now more particularly to the drawing, in which like numerals indicate like parts throughout the several views, FIG. 1 shows a conveyor system 10 which includes a conveyor track 11, a continuous motivating chain 12, and a plurality of trolleys 14. Conveyor track 11 is generally T-shaped in cross section and includes center web 15 and upper and lower flanges 16 and 17. Track 11 is suspended from an overhead support by means of flange 16, and lower flange 17 provides a surface on which trolleys 14 travel.

Trolleys 14 each include a U-shaped support 19, rollers 20 rotatably supported by each leg of U-shaped support 19, and connecting hook 21. Rollers 20 are positioned on opposite sides of web 15 and normally engage the upper surface of lower flange 17. Connecting pin 22 joins U-shaped support 19 to chain 12, so that movement of chain 12 along conveyor track 11 causes rollers 20 to travel over lower flange 17.

Chains 24 are connected to hooks 21 of each trolley 14, and shackles 25 are connected to the lower ends of chains 24. Shackles 25 are generally of flat configuration and each comprises a stationary frame 26 and a movable frame 27. Spring 29 maintains movable frame 27 in its up position, while actuating disc 30 is engageable by a cam surface (not shown) on the conveyor line to press movable frame 27 against the bias of spring 29, to release the fowl from the shackle. Stationary frame 26 is of integral construction and includes vertically extending side frame elements 31 and 32. Since automatic poultry shackles are well known in the art, as shown by U.S. Pat. Nos. 3,113,341; and 3,134,135, a detailed description of shackles 25 is not deemed necessary; however, it should be pointed out that the majority of poultry shackles in present use include vertically extending frame elements, similar to elements 31 and 32.

Shackle clips 34 connect adjacent shackles 25 to one another. Clips 34 comprise a pair of plates 35 and 36 of identical construction, which define a pair of spaced apart parallel grooves 38 and 39, and 40 and 41, respectively. Center bores 42 and 43 extend through plates 35 and 36. Bolt 44 extends through aligned bores 42 and 43, and connects plates 35 and 36 to each other. When plates 35 and 36 are connected to each other by bolt 44, grooves 38 and 40 form a circular opening while grooves 39 and 41 form a similar circular opening. As plate 35 and 36 are drawn together by bolt 44, grooves 38 and 40 are placed about frame element 31 of a shackle 25, while grooves 39 and 41 are placed about a frame element 32 of an adjacent shackle 25. Grooves 38—41 are constructed so that they form an opening which is larger in diameter than the diameter of frame elements 31 and 32, so that clip 34 is movable along the length of frame elements 31 and 32, and adjacent shackles 25 are pivotal in clip 34.

Grooves 38—41 of clip 34 are of sufficient length so that frame elements 31 and 32 of adjacent shackles 25 will be maintained substantially in parallel relationship, and so that adjacent shackles will pivot about parallel axes. Clips 34 tend to maintain adjacent shackles in parallel-spaced relationship; that is, the space between adjacent shackles will generally be maintained substantially constant, and frame elements 31 and 32 will generally stay in alignment with each other along the path of travel of the conveyor. Because of the loose fit of clips 34 about frame elements 31 and 32, adjacent shackles are capable of moving vertically with respect to each other, as when the conveyor climbs to a different elevation or makes a turn in the processing plant; however, when the conveyor extends through a straight path, shackles 25 will be stabilized with respect to each other by clip 34, so that virtually no pivoting or swinging of shackles 25 with respect to each other will take place.

Since clips 34 are connected to stationary frame 26, movable frame 27 still is capable of being depressed to release the fowl in the normal manner. Thus it should be apparent that the conveyor disclosed herein functions to transport fowl in a stabilized attitude without impairing the automatic features of the poultry shackle.

It will be obvious to those skilled in the art that many variations may be made in the embodiment chosen for the purpose of illustrating the present invention without departing from the scope thereof as defined by the appended claims.

We claim:

1. A conveyor system of the type utilized in a poultry processing plant comprising:

an elevated conveyor;

a plurality of shackles suspended from the conveyor at spaced intervals, each of said shackles including a generally flat frame;

connecting means for maintaining the shackles generally in alignment with the conveyor; and each of said shackles comprising upwardly extending frame elements on each side thereof, and said connecting means comprising means for maintaining the upwardly extending frame elements of adjacent shackles in spaced parallel relationship but free to move pivotally and axially with respect to each other.